United States Patent [19]

Kitamura

[11] 4,413,422
[45] Nov. 8, 1983

[54] APPARATUS FOR DETECTING THE POSITION OF A MACHINE TOOL SPINDLE

[75] Inventor: Koichiro Kitamura, Takaoka, Japan

[73] Assignee: Kitamura Machinery Co. Ltd., Takaoka, Japan

[21] Appl. No.: 318,364

[22] Filed: Nov. 5, 1981

[30] Foreign Application Priority Data

Nov. 10, 1980 [JP] Japan ................... 55-156987

[51] Int. Cl.³ .................. G01B 7/00; G01B 11/00
[52] U.S. Cl. ....................... 33/185 R; 33/174 PC
[58] Field of Search .......... 33/1 M, 174 PC, 174 TA, 33/181 R, 185 R; 73/1 J

[56] References Cited

U.S. PATENT DOCUMENTS

| 3,614,909 | 10/1971 | Neuser | 33/185 R |
| 3,684,939 | 8/1972 | Perry | 33/185 R |
| 3,995,528 | 12/1976 | Rethwish | 33/174 PC |
| 4,060,906 | 12/1977 | Heizmann | 33/181 R |
| 4,118,871 | 10/1978 | Kirkham | 33/174 PL |
| 4,333,238 | 6/1982 | McMurtry | 33/174 PC |

FOREIGN PATENT DOCUMENTS

| 52-17276 | 2/1977 | Japan | 33/181 R |
| 56-47704 | 4/1981 | Japan | 33/174 PC |

Primary Examiner—Richard R. Stearns
Attorney, Agent, or Firm—Fleit, Jacobson, Cohn & Price

[57] ABSTRACT

An apparatus for detecting the position of a machine tool spindle is intended to detect the position of the thermally displaced spindle in the x and y directions, respectively, by a single proximity switch to prevent the accuracy of machining from being deteriorated by the thermal displacement due to the heat generation in the bearing or the like of the spindle operated at a high speed, and the apparatus includes a proximity switch fixedly mounted on a base, a proximity member having a sensing hole formed therein adjacent to the proximity switch and slidably mounted on the base, a contactor coupled to the proximity member, and mechanisms for returning the contactor and the proximity member into their original positions in response to the displacement thereof, the base being fixedly mounted on the table of the machine tool, and the contactor being formed with a right angle x-direction and y-direction contact surface adapted for contact with a measuring element mounted on the spindle of the machine tool, thereby using the detected values as zero points and subjecting the count values of coordinates x-axis and y-axis counters of an NC control panel to zero point calibration and using the resulting point as the origin of coordinate in the processing of the work.

5 Claims, 10 Drawing Figures

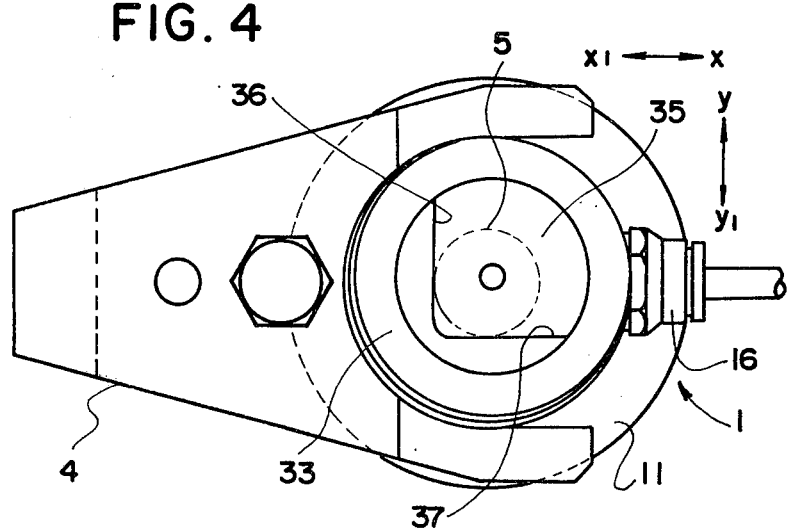
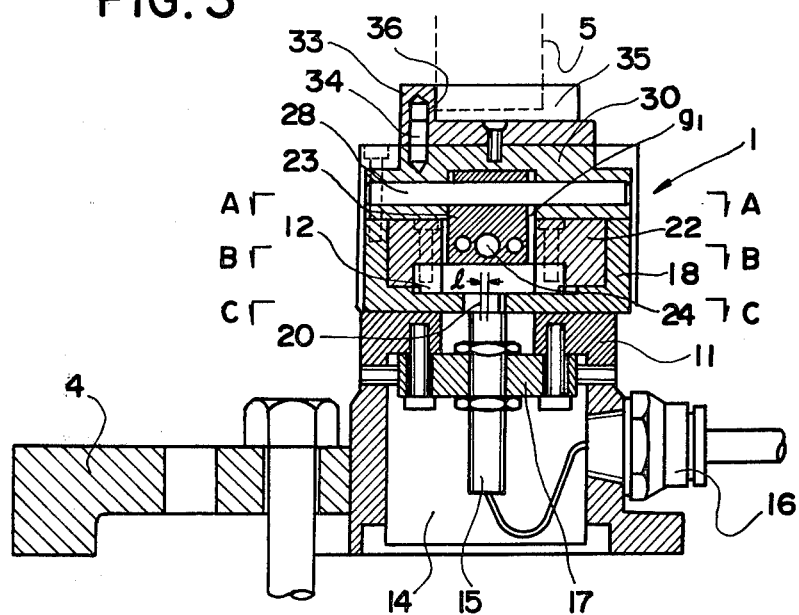

APPARATUS FOR DETECTING THE POSITION OF A MACHINE TOOL SPINDLE

The present invention relates to an apparatus for detecting the position of a machine tool spindle which is designed so that when the spindle of a machine tool is displaced thermally due to the generation of heat in the bearing of the spindle, the amount of displacement of the spindle is detected and the reference point is corrected automatically.

Recently, component parts made from non-ferrous metal materials such as aluminum or plastic material have been increasingly machined by machine tools. As a result, machine tools have been required to perform cutting at very high speeds, and machining centers as well as numerically controlled lathes and milling machines have been so designed that their spindles are now operated at extremely high speeds of 5,000 to 7,000 rpm compared with the previous highest spindle speed of 2,000 to 3,000 rpm. As the spindle speed has been increased, high-speed bearings of the super precision grade have been used as spindle supporting bearings, although the generation of heat from the bearings has been unavoidable. As a result, as shown in FIG. 1, heat will be generated from an entire bed B due to the conduction of heat from the bearing so that the entire bed B including a spindle S will be displaced in the X, Y or Z direction and the coordinates origin will be shifted thus causing variation in the accuracy of machining. Since such thermal displacement occurs in all machine tools, compensation has been generally provided for the thermal displacement by such methods as installing the machine tool in a constant temperature room and cooling the bed B by a cooler. However, these methods are not perfect and have the disadvantage of tending to be affected by variations in the room temperature and the spindle speed and being quite expensive.

To overcome these disadvantages, a method has been proposed in which instead of reducing the amount of heat generation, the displacement of the spindle of a machine tool is detected and fed back to the NC control panel of the machine tool and the necessary calculations are performed by a control unit to calibrate the coordinate origin. More specifically, two proximity switches are mounted on the table T and a test bar is mounted on the spindle S. Then, the table T is moved while lowering the bed B, so that one of the proximity switches is brought near to the test bar from the X-axis direction to detect the displacement of the spindle in the X-axis direction and then the table T is moved in the Y-axis direction to bring the other proximity switch near to the test bar from the Y-axis direction and detect the displacement of the spindle S in the Y-axis direction, thus calibrating the coordinates origin in accordance with the X-axis and Y-axis direction count values. However, this known method has the following disadvantages:

(1) The reaction position of the proximity switches varies greatly in dependence on a variation of the gap between the proximity switch and the lower surface of the test bar and it is extremely difficult to adjust the gap between the two through vertical movement of the bed B.

(2) Since the cutting of a work is performed on the table surface, the table surface is extremely detrimental as an environment and the proximity switches cannot be protected.

(3) To arrange the two proximity switches on the table surface is not desirable since they reduce the space for mounting a work and they also impede the operations.

With a view to overcoming the foregoing deficiencies in the prior art, it is the object of the present invention to provide an improved machine tool spindle position detecting apparatus in which the amount of displacement of a spindle of a machine tool due to thermal displacement is detected by a single proximity switch, thus rapidly and accurately calibrating the displacement of the spindle and improving the accuracy of machining.

In accordance with the present invention there is thus provided a machine tool spindle position detecting apparatus in which a single proximity switch is used to detect the position of a thermally displaced spindle of a machine tool in both the X-axis and Y-axis directions, whereby these positions are used as zero points and the count values of coordinates X-axis and Y-axis counters of an NC control panel are subjected to zero calibration, thus using the resulting point as the coordinates origin.

The present invention will now be described by way of example in conjunction with the accompanying drawings, in which:

FIG. 3 is a longitudinal sectional view showing an embodiment of the invention;

FIG. 4 is a plan view of FIG. 3;

Figure 6A:
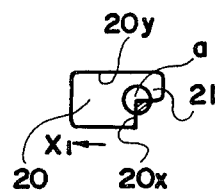
Figure 6B:
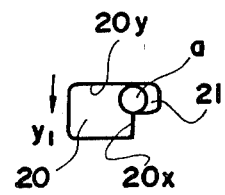
Figure 6C:
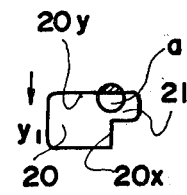

FIGS. 6(a) to 6(c) show a plurality of diagrams (a), (b) and (c) useful for explaining the operation of the proximity switch and the sensing hole used in the apparatus of this invention.

Figure 1:
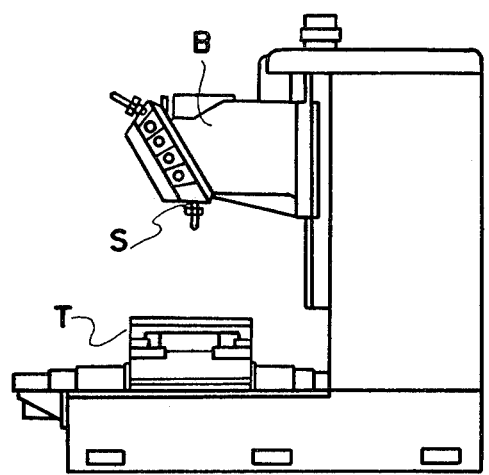
FIG. 1 is a side view of a machine tool useful for explaining the present invention.
Figure 2:
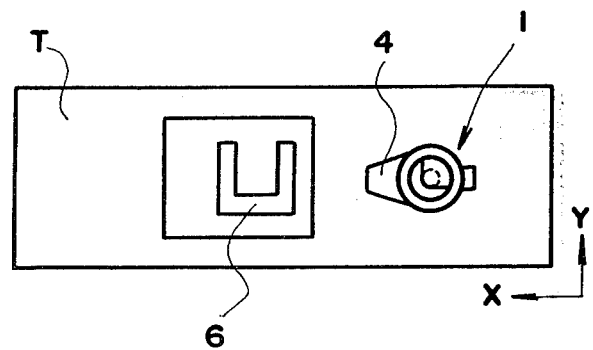
FIG. 2 is an enlarged plan view of the table shown in FIG. 1.
Figure 5A:
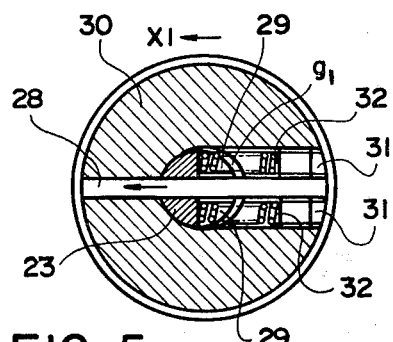
FIG. 5(a) shows a sectional view taken along the line A—A of FIG. 3, FIG. 5(b) a sectional view taken along the line B—B of FIG. 3.

Referring now to FIGS. 2 to 4, numeral 1 designates a position detecting apparatus mounted on a table T of a machine tool by a fastening member 4. Numeral 6 designates a work to be machined. Numeral 11 designates a base including a small-diameter portion 12 having a slot 13 on its upper part as shown in FIG. 5(c) and a central hole 14 made through it and comprising a large-diameter portion and a small-diameter portion. Numeral 15 designates a proximity switch centrally positioned within the hole 14 and attached to the base 11 by a member 17. Numeral 16 designates a connector for bringing the lead wire of the proximity switch 15 to the outside. Numeral 18 designates a bottomed cylindrical proximity member having a pair of elongated holes 19 in its bottom portion as shown in FIG. 5(c). The elongated holes 19 are engaged with the small-diameter portion 12 of the base 11 and the proximity member 18 is slidable in the X and Y directions on the base 11. Numeral 20 designates a rectangular sensing hole formed in the bottom portion of the proximity member 18 and its longitudinal center is displaced by a distance l from the center of a sensing element a of the proximity switch 15. Numeral 21 designates a notch formed in one side wall of the sensing hole 20 as shown in FIG. 5(c). Numeral 22 designates a cylindrical coupling member fastened to the base 11 by screws.

Figure 5B:
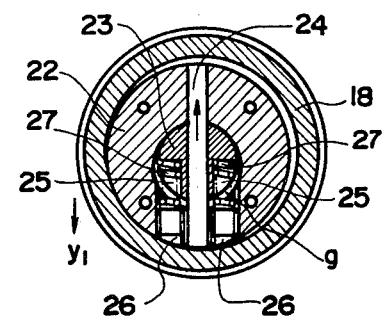
FIG. 5(c) shows a sectional view taken along the line C—C of FIG. 3.
Figure 5C:
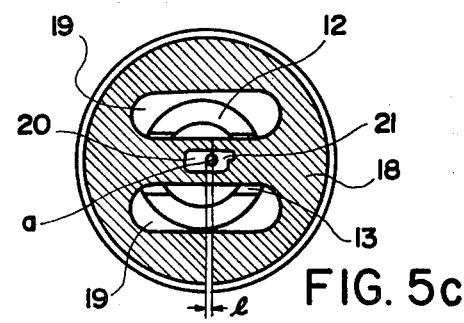

Numeral 23 designates a cylindrical connecting member through which a rod 24 is fixedly extended as shown in FIG. 5(b), and the rod 24 is slidably inserted into the coupling member 22. Numeral 25 designates a pair of blind holes formed in the connecting member 23 to extend parallel to the rod 24, and a pair of springs 27 is disposed between the blind holes 25 and a pair of tapped holes 26 formed in the coupling member 22 so that the connecting member 23 is always urged in the direction of the arrow and a gap g is formed between the coupling member 22 and the connecting member 23. As shown in FIG. 5(a), a rod 28 is fitted in the upper part of the connecting member 23 to cross the rod 24 at right angles, and the rod 28 is slidably inserted into a sliding plate 30 positioned on the proximity member 18. Numeral 29 designates a pair of blind holes formed in the connecting member 23 to extend parallel to the rod 28, and a pair of springs 32 is disposed between a pair of tapped holes 31 formed in the sliding plate 30 and the blind holes 29 in such a manner that the connecting member 23 is always urged in the direction of the arrow and a gap $g_1$ is formed between the connecting member 23 and the sliding plate 30. The proximity member 18 and the sliding plate 30 are joined together by screws. Numeral 33 designates a contactor positioned on the sliding plate 30 by a locating pin 34 and fixed in position by screws. The upper surface of the contactor 33 is cut out at right angles in plane to form a recessed portion 35 which in turn provides an X-axis direction contact surface 36 and a Y-axis direction contact surface 37.

With the construction described above, the operation of the position detecting apparatus will now be described. The position detecting apparatus 1 is first fixedly mounted on the table T by the fastening member 4 as shown in FIG. 2. Then, a measuring element 5 comprising a rod of a small temperature coefficient is fitted on the spindle S of the machine tool and the table T is moved while lowering the bed B thus fitting the measuring element 5 in the recessed portion 35 of the contactor 33 in the position detecting apparatus 1. In this condition, if the table T is moved in the x direction (FIG. 4), the measuring element 5 is pressed against the x-axis direction contact surface 36 of the contactor 33 and the contactor 33 is displaced in an $x_1$ direction. The displacement of the contactor 33 displaces the sliding plate 30 in the $x_1$ direction against the springs 32 of the rod 28 and the proximity member 18 coupled to the sliding plate 30 is displaced in the $x_1$ direction. In this case, as shown in FIG. 6(a), a wall surface 20x of the sensing hole 20 formed in the bottom portion of the proximity member 18 is also displaced in the $x_1$ direction so that when the wall surface 20x overlaps the sensing element a of the proximity switch 15 by a predetermined area, the proximity switch 15 is operated and its output signal is sent as an x-axis count value to the NC control panel. Simultaneously, the table T is stopped.

Then, as the table T is moved in the y direction (FIG. 4), the contactor 5 is pressed against the y-axis direction contact surface 37 and the contactor 33 is displaced in a $y_1$ direction. As the result of the displacement of the contactor 33, the proximity member 18 is displaced in the $y_1$ direction and also the connecting member 23 is displaced in the $y_1$ direction by way of the rod 24 against springs 27. When the proximity member 18 is moved in the $y_1$ direction, as shown in FIG. 6(b), the sensing element a of the proximity switch 15 is first brought opposite to the notch 21 of the sensing hole 20 and it is stopped temporarily. As the proximity member 18 is displaced further in the $y_1$ direction, as shown in FIG. 6(c), a wall surface 20y overlaps the sensing element a and the overlapping reaches a predetermined area. When this occurs, the proximity switch 15 is operated and its output signal is sent as a y-axis count value to the NC control panel. Simultaneously, the table T is stopped.

In accordance with the thus obtained count values of the x-axis and y-axis counters, the coordinates of the NC control panel are subjected to zero point calibration and the resulting point is used as the coordinates origin. Thus, by machining component parts or the like in accordance with the NC input data, it is possible to machine the component parts with a high degree of accuracy owing to no deviation of the zero points.

After the zero point calibration has been completed, if the table T is returned to the original position or the bed B is moved upward so that the measuring element 5 is separated from the contactor 33, the respective elements are also returned to their original positions by the springs 27 and 29.

Although not shown, in order to accomplish the automatic positioning in the above-described manner, an additional function of stopping the movement of the table upon actuation of the proximity switch must be provided in addition to the position detecting aparatus of this invention. For instance, a proximity switch actuation indicative signal may be applied to the NC control panel to automatically stop the table. On the other hand, the repetitive accuracy of the proximity switch is dependent on the closing rate of the proximity member and the time interval between the time of actuation of the proximity switch and the time of stopping the table and the repetition accuracy can be improved to about $\pm 1\mu$ by making the closing rate of the proximity member sufficiently low.

It will thus be seen from the foregoing description that the present invention has the following advantages:
(1) The gap between the proximity switch and the proximity member is always maintained constant and the proximity member is displaceable by means of the measuring element and the contactor, thus always maintaining the actuation position of the proximity switch at a fixed position.
(2) Since the proximity switch and the sensing hole of the proximity member are protected by the base, the proximity member, the sliding plate, etc., they are not influenced by the circumstances on the table.
(3) Since the detection in both the x and y directions is accomplished by the single detector, the occupied area on the table is reduced, thus increasing the work mounting space and presenting no hindrance to the operations.
(4) The improved repetition accuracy makes it possible to use the apparatus over a long period of time.
(5) The equipment cost is considerably low as compared with the prior art apparatus provided with a constant temperature room or cooled by a cooler.

What is claimed is:
1. An apparatus for detecting the position of a spindle of a machine tool comprising:
a base;
a proximity switch fixedly mounted on said base;
a proximity member slidably mounted on said base and having a sensing hole formed therein adjacent to said proximity switch;
a contactor coupled to said proximity member; and
means effective when said contactor and said proximity member are displaced for returning said con- tactor and said proximity member to original positions thereof;

said base being adapted to be fixedly mounted on a table of said machine tool; and said contactor being formed with a right-angle x-direction and y-direction contact surface adapted for contact with measuring means mounted on the spindle of said machine tool.

2. An apparatus according to claim 1, wherein said return means comprises: a coupling member having a hole formed substantially in the central portion thereof and secured to said base; a sliding plate having a hole formed substantially in the central portion thereof and secured to said proximity member, and a connecting member movably fitted in said holes of said sliding plate and said coupling member, wherein two rods crossing each other at right angles are fixedly fitted in said connecting member in such a manner that one of said rods is slidably inserted in said coupling member and the other of said rods is slidably inserted in said sliding plate, and wherein said connecting member is formed with a plurality of blind holes along each of said rods to extend parallel thereto and a spring is fitted in each of said blind holes and each of corresponding tapped holes formed in said coupling member and said sliding plate, respectively.

3. An apparatus according to claim 1, wherein said sensing hole includes at least one wall surface perpendicular to each of an x and a y axis, and wherein one or the other of said wall surface is partly cut to form a concave surface.

4. An apparatus according to claim 3, wherein said sensing hole is formed into a generally rectangular shape, and wherein the longitudinal center of said sensing hole is slightly displaced from the center of a sensing element of said proximity switch.

5. An apparatus according to claim 1, wherein an upper surface of said contactor is cut out at right angles in plane to form a recessed portion thereon.

* * * * *